US009550601B2

(12) United States Patent
Komatsu et al.

(10) Patent No.: US 9,550,601 B2
(45) Date of Patent: Jan. 24, 2017

(54) CONTAINERS OF A MULTILAYERED STRUCTURE

(75) Inventors: Ikuo Komatsu, Yokohama (JP); Eriko Kimotsuki, Yokohama (JP); Jou Honda, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 344 days.

(21) Appl. No.: 14/347,536

(22) PCT Filed: Sep. 6, 2012

(86) PCT No.: PCT/JP2012/072715
§ 371 (c)(1),
(2), (4) Date: Mar. 26, 2014

(87) PCT Pub. No.: WO2013/054616
PCT Pub. Date: Apr. 18, 2013

(65) Prior Publication Data
US 2015/0041465 A1 Feb. 12, 2015

(30) Foreign Application Priority Data
Oct. 11, 2011 (JP) ................. 2011-224194

(51) Int. Cl.
*B65D 1/40* (2006.01)
*B32B 1/02* (2006.01)
*B65D 1/00* (2006.01)
*B65D 1/02* (2006.01)
*B32B 27/32* (2006.01)
*B32B 27/30* (2006.01)
*B65D 65/40* (2006.01)
*B32B 7/12* (2006.01)
*B32B 27/08* (2006.01)
*B32B 1/08* (2006.01)

(52) U.S. Cl.
CPC . *B65D 1/40* (2013.01); *B32B 1/02* (2013.01); *B32B 1/08* (2013.01); *B32B 7/12* (2013.01); *B32B 27/08* (2013.01); *B32B 27/30* (2013.01); *B32B 27/306* (2013.01); *B32B 27/32* (2013.01); *B32B 27/327* (2013.01); *B65D 1/00* (2013.01); *B65D 1/02* (2013.01); *B65D 1/0215* (2013.01); *B65D 65/40* (2013.01); *B32B 2250/05* (2013.01); *B32B 2250/246* (2013.01); *B32B 2250/40* (2013.01); *B32B 2270/00* (2013.01); *B32B 2307/54* (2013.01); *B32B 2307/558* (2013.01); *B32B 2307/72* (2013.01); *B32B 2307/7244* (2013.01); *B32B 2439/60* (2013.01); *B32B 2439/70* (2013.01); *Y10T 428/1379* (2015.01); *Y10T 428/1383* (2015.01); *Y10T 428/3192* (2015.04); *Y10T 428/31855* (2015.04); *Y10T 428/31909* (2015.04); *Y10T 428/31913* (2015.04)

(58) Field of Classification Search
CPC ........ B32B 27/30; B32B 27/306; B32B 27/32; B32B 27/327; B32B 1/02; B65D 1/00; B65D 1/02; B65D 1/0215; B65D 1/40; Y10T 428/1379; Y10T 428/1383; Y10T 428/31855; Y10T 428/31909; Y10T 428/31913; Y10T 428/3192
See application file for complete search history.

(56) References Cited

U.S. PATENT DOCUMENTS

| 4,409,364 A | 10/1983 | Schmukler et al. |
| 4,419,408 A | 12/1983 | Schmukler et al. |
| 4,430,135 A | 2/1984 | Schmukler et al. |
| 4,472,555 A | 9/1984 | Schmukler et al. |
| 4,477,532 A | 10/1984 | Schmukler et al. |
| 4,511,610 A | 4/1985 | Yazaki et al. |
| 2004/0224175 A1* | 11/2004 | Henderson ............ B29C 55/023 428/515 |
| 2005/0142309 A1* | 6/2005 | Goto ....................... B32B 27/18 428/34.6 |

FOREIGN PATENT DOCUMENTS

| EP | 0 179 639 A2 | 4/1986 |
| JP | 57-53578 A | 3/1982 |
| JP | 58-103569 A | 6/1983 |
| JP | 59-81167 A | 5/1984 |
| JP | 1-217091 A | 8/1989 |
| JP | 2010-189052 A | 9/2010 |
| JP | 2011-25964 A | 2/2011 |
| WO | 01/14123 A1 | 3/2001 |
| WO | 2007/047134 A1 | 4/2007 |
| WO | 2010/029968 A1 | 3/2010 |
| WO | 2010/103985 A1 | 9/2010 |

OTHER PUBLICATIONS

Extended European Search Report dated Mar. 30, 2015, issued by the European Patent Office in counterpart European application No. 12839703.1.
International Search Report of PCT/JP2012/072715, dated Nov. 6, 2012.

* cited by examiner

*Primary Examiner* — Walter B Aughenbaugh
(74) *Attorney, Agent, or Firm* — Sughrue Mion, PLLC

(57) ABSTRACT

A container of a multilayered structure comprising an inner layer and an outer layer of a low-density polyethylene, and an intermediate layer that includes a gas-barrier resin layer and adhesive layers, wherein the adhesive layers contain an acid-modified polyethylene and a propylene resin, the propylene resin being contained in an amount of 0.5 to 10% by weight in the adhesive layers. The container is obtained by using decreased amounts of resins without impairing properties of the containers.

6 Claims, No Drawings

CONTAINERS OF A MULTILAYERED STRUCTURE

CROSS REFERENCE TO RELATED APPLICATIONS

This application is a National Stage of International Application No. PCT/JP2012/072715filed Sep. 6, 2012, claiming priority based on Japanese Patent Application No. 2011-224194, filed Oct. 11, 2011, the contents of all of which are incorporated herein by reference in their entirety.

TECHNICAL FIELD

This invention relates to containers of a multilayered structure and, more specifically, to containers having inner and outer layers formed by using a low-density polyethylene.

BACKGROUND ART

Owing to their easy formability and inexpensive production costs, plastic containers have been used in a variety of applications. Specifically, the low-density polyethylene has a low crystallinity, and is soft and flexible, and the containers made therefrom permit the contents to be easily squeezed out and, therefore, have been widely used for containing paste-like contents such as ketchup, mayonnaise, paste, honey, shampoo and the like.

Because of their low gas-barrier property, however, the above polyethylene containers are, usually, formed in a multilayered structure including, as an intermediate layer, a gas-barrier layer as represented by an ethylene-vinyl alcohol copolymer. The multilayered structure of this kind uses an acid-modified olefin resin as an adhesive for adhering the gas-barrier resin layer which is the intermediate layer to the inner and outer polyethylene layers (e.g., see patent documents 1 and 2).

PRIOR ART DOCUMENTS

Patent document 1: JP-A-2011-25964
Patent document 2: JP-A-2010-189052

OUTLINE OF THE INVENTION

Problems that the Invention is to Solve

In recent years, it has been desired to decrease the amount of use of the resins in the field of the containers, too, to avoid depletion of resources. When it comes to, for example, containers, however, it is very difficult to decrease the amount of the resins without lowering properties required for the containers. For example, the above polyethylene containers are accompanied by a problem in that a decrease in the amount of the polyethylene (low-density polyethylene) forming the inner and outer layers results in a loss of container properties such as buckling strength and shock resistance (shatter strength).

It is, therefore, an object of the present invention to provide containers of a multilayered structure made from a polyethylene which makes it possible to decrease the amount of the resins without impairing properties of the containers.

Means for Solving the Problems

The present inventors have conducted experiments and study extensively about decreasing the amount of the resins used for producing the polyethylene containers of multilayered structures, have unexpectedly discovered the fact that upon blending the adhesive layers with a small amount of propylene resin, the container properties could be improved and the improved properties could be maintained despite the inner and outer layers are formed by using the polyethylene in decreased amounts and have, thus, completed the invention.

According to the present invention, there is provided a container of a multilayered structure comprising an inner layer and an outer layer of a low-density polyethylene, and an intermediate layer that includes a gas-barrier resin layer and adhesive layers, wherein the adhesive layers contain an acid-modified polyethylene and a propylene resin, the propylene resin being contained in an amount of 0.5 to 10% by weight in the adhesive layers.

In the present invention, it is desired that:

(1) The adhesive layers, further, contain a linear low-density polyethylene;
(2) The acid-modified polyethylene is the one obtained by modifying the linear low-density polyethylene with an acid; and
(3) The acid-modified polyethylene has a density in a range of from 0.925 to 0.950 g/cm$^3$.

The container of the multilayered structure is obtained, usually, by the direct blow-forming.

Effects of the Invention

In the container of the multilayered structure of the invention, the adhesive layers that contain the acid-modified polyethylene are blended with a small amount of propylene resin, and exhibit improved buckling strength and shock resistance contributing to decreasing the amount of the resin (i.e., decreasing the weight).

For example, as will be understood from the experimental results of Examples appearing later, the container of the multilayered structure having a small amount of the propylene resin added to the adhesive layers, does not almost permit a decrease in the buckling strength or in the shock resistance (shatter strength) despite the inner and outer layers are formed by using the low-density polyethylene in decreased amounts (despite the inner and outer layers are thinly formed) or despite the total weight of the resins forming the container is decreased by about 10% by weight. These properties are equivalent to, or superior to, those of the container of Control Example in which the weight of the resins is not decreased. Due to the addition of the propylene resin, furthermore, there is recognized no decrease in the adhesiveness.

Addition of the propylene resin might impair the appearance of the containers. However, the impairment of appearance can be effectively avoided by the addition of the linear low-density polyethylene (LLDPE).

MODES FOR CARRYING OUT THE INVENTION

The container of a multilayered structure of the present invention has a basic layer structure in that the inner and outer layers are formed by using a low-density polyethylene, a gas-barrier resin layer is formed as an intermediate layer between the inner layer and the outer layer, and adhesive layers are formed among the gas-barrier resin layer, the inner layer and the outer layer.

<Inner and Outer Layers>

In the invention, the inner and outer layers are the layers positioned on the inner surface and the outer surface of a container, and are formed by using a low-density polyethylene (LDPE).

The low-density polyethylene is a polyethylene having a density in a range of not less than 0.910 g/cm$^3$ but less than 0.930 g/cm$^3$. It is different from a linear low-density polyethylene (LLDPE) in regard to that it has many short branches attached to the linear molecules, and is soft and very excels in formability.

Among the low-density polyethylenes, there is used the one having an MFR (190° C.) of from about 0.2 to about 20 g/10 min. from the standpoint of formability.

The container having inner and outer layers formed by using the above low-density polyethylene is imparted, specifically, with flexibility and squeezing property. When filled with a paste-like content, therefore, the container makes it possible to effectively squeeze out the content.

The thicknesses of the inner and outer layers of the low-density polyethylene are so set that basic properties of the container are maintained to meet the use and that the thickness of the container as a whole does not become unnecessarily large. The present invention makes it possible to decrease the thickness by about 10% as compared to the conventional known polyethylene containers. In this case, too, the container maintains basic properties which are comparable to those of the known containers, which is a great advantage of the invention.

Further, the inner and outer layers can be blended with a suitable lubricant. For example, depending on the kind of the content to be contained in the container, the inner layer may be blended with the lubricant to improve slipping property for the content in the container so that the content in the container can be discharged (squeezed) out of the container highly efficiently. Further, upon blending the outer layer with the lubricant, the containers can be prevented from sticking to each other in the step of conveying the containers or the containers can be prevented from sticking to the conveyer belt, enabling the containers to be conveyed highly efficiently.

As the lubricant, there can be used the ones that have been known per se. such as those described below.
(a) Those of the type of hydrocarbons, such as fluidized, natural or synthetic paraffin, micro wax, polyethylene wax, chlorinated polyethylene wax, etc.
(b) Those of the type of fatty acid, such as stearic acid, lauric acid, etc.
(c) Those of the type of aliphatic amide, such as stearic acid amide, palmitic acid amide, oleic acid amide, erucic acid amide, methylenebisstearamide, ethylenebisstearamide, etc.
(d) Those of the type of fatty acid ester, such as butyl stearate, cured castor oil, ethylene glycol monostearate, etc.
(e) Those of the type of alcohol, such as cetyl alcohol, stearyl alcohol, etc.
(f) Metal soaps such as zinc stearate, calcium stearate, etc.
(g) Polyorganosiloxane.

These lubricants can be used in one kind alone or in a mixture of two or more kinds, and the amount of use thereof in the inner and outer layers may be about 0.01 to about 0.5% by weight.

Depending on the use, further, the inner and outer layers may be blended with an ultraviolet ray absorber, a pigment, a dye or various kinds of fillers in amounts that will not impair the basic properties of the containers.

<Gas-Barrier Resin Layer>

In the container of the multilayered structure of the invention, a gas-barrier resin layer (hereinafter often simply called "gas-barrier layer") is formed as an intermediate layer between the inner layer and the outer layer. Upon providing the gas-barrier layer, it is allowed to effectively suppress the content from being deteriorated by oxygen that permeates through.

As the gas-barrier resin used for forming the above layer, there can be typically used an ethylene-vinyl alcohol copolymer (saponified product of an ethylene-vinyl acetate copolymer) and aromatic polyamide and, specifically, there can be used an ethylene-vinyl alcohol copolymer from the standpoint of its high oxygen-barrier property.

As the ethylene-vinyl alcohol copolymer, there can be, usually, used saponified products of those copolymers that are obtained by so saponifying the ethylene-vinyl acetate copolymer having an ethylene content of 20 to 60 mol % and, specifically, 25 to 50 mol % that the degree of saponification is not less than 96 mol % and, specifically, not less than 99 mol %. As the gas-barrier resin among them, there can be most preferably used the one having a suitable degree of formability (MFR), e.g., an ethylene-vinyl alcohol copolymer having an MFR comparable to that of the low-density polyethylene (LDPE) forming the inner and outer layers.

The above gas-barrier layer has a thickness that is so selected as to exhibit excellent oxygen barrier property, e.g., has a thickness lying in a range of from about 5 to about 50 μm.

The gas-barrier resin layer can be imparted with oxygen-absorbing property to improve the gas barrier property (oxygen barrier property).

To impart the oxygen-absorbing property, the gas-barrier resin layer may be blended with an oxidizing polymer. As required, further, a transition metal catalyst (oxidizing catalyst) may be added to further improve the oxygen-absorbing property. That is, upon oxidizing the oxidizing polymer, oxygen is trapped by absorption to enhance the gas barrier function of the gas-barrier resin. The transition metal catalyst is suitably added to promote the oxidation of the oxidizing polymer.

The above oxygen-absorbing gas-barrier resin layer by itself has been widely known, and oxidizing polymers and transition catalysts have been disclosed in JP-A-2003-266619. As the oxidizing polymer, for example, there is used an ethylenically unsaturated group-containing polymer. Namely, the polymer has a carbon-carbon double bond which easily undergoes oxidation with oxygen to trap and absorb oxygen. As the ethylenically unsaturated group-containing polymer, there can be exemplified homopolymers and copolymers having an oxidizing constituent unit stemming from a conjugated diene such as butadiene; chain-like non-conjugated diene such as 1,4-hexadiene; or a cyclic non-conjugated diene such as methyltetrahydroindene. To improve dispersion property, a functional group such as carboxylic acid group or carboxylic anhydride group may be introduced into these polymers. The above oxidizing polymer can be added in an amount of about 1 to about 15 parts by weight per 100 parts by weight of the gas-barrier resin.

In regard to the transition metal catalyst that is suitably used, further, the transition metal will be a metal of the Group VIII of periodic table, such as iron, cobalt or nickel, a metal of the Group I such as copper or silver, a metal of the Group IV such as tin, titanium or zirconium, a metal of the Group V such as vanadium, a metal of the group VI such as chromium, or a metal of the Group VII such as manganese. Among them, cobalt is preferred for it markedly promotes the oxygen-absorbing property (oxidation of the oxidizing polymer). The above transition metal catalysts are, usually, in the form of inorganic salts (e.g., halides), organic salts (e.g., carboxylates) or complex salts (e.g., complexes of β-diketone and β-keto-acid ester). The above transition metal catalyst can be added in an amount of, for example, about 10 to about 1,000 ppm calculated as metal per 100 parts by weight of the above gas-barrier resin.

<Adhesive Layers>

The adhesive layers are the layers that serve as the skeleton of the container of the multilayered structure of the invention, and comprise an acid-modified polyethylene and a propylene resin, and, as required, are, further, blended with a linear low-density polyethylene (LLDPE).

The acid-modified polyethylene used for the adhesive layers works as an adhesive for firmly adhering the gas-barrier layer of the gas-barrier resin to the inner and outer layers of the low-density polyethylene (LDPE). The acid-modified polyethylene is a polyethylene graft-modified with a carboxylic acid such as maleic acid, itaconic acid or fumaric acid, or with an anhydride, or an amide or an ester thereof. Preferably, the acid-modified polyethylene is a polyethylene graft-modified with the maleic acid or the anhydrous maleic acid.

Further, though there is no specific limitation, the polyethylene to be modified is, preferably, a low-density polyethylene (LDPE) or a linear low-density polyethylene (LLDPE) from the standpoint of adhesiveness to the inner and outer layers and is, specifically, the linear low-density polyethylene (LLDPE) from the standpoint of favorably dispersing the propylene resin that will be described later, avoiding a decrease in the appearance of the container and improving properties of the container (buckling strength and shock resistance).

The linear low-density polyethylene (LLDPE) has a low density by being copolymerized with an α-olefin such as 1-butene, 1-hexane or 4-methylpentene-1 to a degree of several percent to introduce short-chain branches into the long chain, and is different from the low-density polyethylene (LDPE) that is forming the inner and outer layers in regard to that it has fewer short-chain branches. The linear low-density polyethylene (LLDPE) is superior to the low-density polyethylene (LDPE) in regard to, for example, strength and toughness.

From the standpoint of adhesiveness (closely adhesion), further, the modification ratio is better high, e.g., the acid-modified polyethylene having a density in a range of 0.925 to 0.950 g/cm$^3$ is desired. The larger the density, the higher the modification ratio is due to the acid.

From the standpoint of formability, further, it is desired that the acid-modified polyethylene has an MFR (190° C.) of about 0.2 to about 30 g/10 min.

To maintain favorable adhesiveness yet enabling the container to exhibit sufficiently improved properties based on a propylene resin that will be described below, it is desired that the acid-modified polyethylene is contained in the adhesive layer in an amount of at least not less than 3% by weight, specifically, 5 to 49% by weight and, more preferably, 7 to 20% by weight.

The most important feature of the present invention is to add the propylene resin to the adhesive layers that contain the acid-modified polyethylene. With the propylene resin being contained in the adhesive layers in an amount of 0.5 to 10% by weight and, preferably, 1.0 to 5.0% by weight, it is made possible to improve the buckling strength and shock resistance of the container.

For example, if the propylene resin is added to the adhesive layer in an amount larger than the above range, then the shock resistance decreases. If, for example, the thicknesses of the inner and outer layers are decreased to decrease the total weight of the resins by about 10%, then the shatter strength decreases considerably. Further, if the amount of the propylene resin that is added is smaller than the above range and the thicknesses of the inner and outer layers are decreased to decrease the total weight of the resins, then not only the shock resistance but also the buckling strength greatly decrease and it becomes difficult to maintain, for example, the self-standing ability of the container.

Namely, upon adding the propylene resin to the adhesive layers in an amount in the above range, it is allowed to decrease the thicknesses of the inner and outer layers and to greatly decrease the total weight of the resins yet greatly improving the buckling strength and shock resistance.

As the propylene resin to be used in the invention, there can be used not only a homopolypropylene but also a copolymer obtained by copolymerizing a propylene with other α-olefins such as ethylene, 1-butene, 4-methyl-1-pentene or the like in small amounts. The homopropylene, however, is most desired.

It is, further, desired that the propylene resin that is used has an MFR (190° C.) of about 0.2 to about 30 g/10 min. from the standpoint of formability.

Here, if the propylene resin is added to the adhesive layers, it is probable that the propylene resin is not favorably dispersed in the acid-modified polyethylene deteriorating the appearance of the container or, concretely, deteriorating the transparency. To alleviate deterioration of appearance of the container caused by poor dispersion of the propylene resin, it is desired to use the linear low-density polyethylene (LLDPE) together with the acid-modified polyethylene.

As described already, the linear low-density polyethylene (LLDPE) is different from the low-density polyethylene (LDPE) that is forming the inner and outer layers in regard to that it has fewer short-chain branches. The linear low-density polyethylene (LLDPE) exhibits good affinity to not only the acid-modified polyethylene which is a matrix of the adhesive layers but also to the propylene resin, enabling, therefore, the propylene resin to be favorably dispersed in the adhesive layers and making it possible to effectively alleviate a decrease in the appearance.

The linear low-density polyethylene (LLDPE) used for improving dispersion property of the propylene resin can, usually, be contained in the adhesive layers in an amount of 31.0 to 96.5% by weight and, specifically, 50 to 90% by weight.

Desirably, further, the linear low-density polyethylene (LLDPE) uses butene as the comonomer to greatly improve the dispersion property of, specifically, the propylene resin.

Further, the linear low-density polyethylene (LLDPE) has an MFR (190° C.) of, desirably, about 0.2 to about 30 g/10 min.

In the invention, the adhesive layers containing the above-mentioned components should be formed in a thickness that maintains favorable adhesiveness and assures improved properties of the containers and, usually, may be formed in a thickness of 1 to 50 μm and, specifically, about 2 to about 20 μm.

<Other Layers>

The container of the multilayered structure of the invention includes inner and outer layers of the low-density polyethylene (LDPE), gas-barrier layer and adhesive layers. Here, however, the regrind (scrap resin) that generates in the step of forming the containers may be used being mixed into the virgin low-density polyethylene in a range in which the properties of the containers are not impaired. In this case, the amount of the regrind will be about 10 to 60 parts by weight per 100 parts by weight of the virgin low-density polyethylene from the standpoint of positively reusing the resources.

The position of the regrind layer may be to abut the inner layer or the outer layer so will not to adversely affect the properties of the containers, and the thickness thereof may be to such an extent that will not cause the thickness of the containers to become unnecessarily large.

The thickness of the layer that abuts the inner or outer layer is so selected that the overall thickness of the container wall does not become unnecessarily large and that the lubricant contained in the layer can be quickly bled to the outer layer, and is, usually, selected to be about 20 to about 100 μm.

Preferably, the container of the multilayered structure of the invention having the above-mentioned layer structure is produced by, typically, melt-extruding the parison of the tubular shape by coextruding resin compositions for forming the layers and directly blow-forming the parison into the shape of a bottle by using, for example, a two-split metal mold. It is also allowable, as a matter of course, to form a preform of the shape of a flat plate having a predetermined layered structure by extrusion forming or injection forming and, thereafter, plug-assist-forming the preform into a cup-shaped container.

The above container of the present invention can be desirably used for containing, specifically, viscous paste-like contents, such as ketchup, aqueous paste, honey, sources, shampoo, etc. and can, particularly desirably, be used as a squeeze bottle for squeezing the content out. In producing the containers of this kind, the present invention makes it possible to greatly decrease the weight of the resins without impairing properties of the containers.

EXAMPLES

The invention will now be described by way of the following Examples.

Properties of the containers and properties of the resins that were used were measured according to the methods described below.

(1) Buckling Strength.

The obtained multilayered container was set with its mouth portion facing upward into a compression tester, a load was exerted thereon in the longitudinal direction at a rate of 10 mm a minute, and the load (kgf) by which the container buckled was regarded to be a buckling strength. Five containers were measured to find an average value which was then evaluated on the following basis. The containers marked with ⊚, ○ and Δ were regarded to be in allowable ranges.

⊚: Not less than 5 kgf.
○: Not less than 4 kgf but less than 5 kgf.
Δ: Not less than 3 kgf but less than 4 kgf.
X: Less than 3 kgf.

(2) Tensile Modulus of Elasticity.

A test piece was cut out from a flat body wall of the obtained multilayered container in compliance with the JIS 7113, and was put to the tension test in the direction of height of the container to measure the tensile modulus of elasticity. Five test pieces were measured to find an average value which was then evaluated on the following basis. The containers marked with ○ and Δ were regarded to be in allowable ranges.

○: Not less than 800 MPa.
Δ: Not less than 700 MPa but less than 800 MPa.
X: Less than 700 MPa.

(3) Shatter Strength.

The obtained multilayered containers were each filled with 300 ml of tap water, stored in a refrigerator maintained at 5° C. for 24 hours, taken out therefrom, and were permitted to fall onto the concrete floor surface from a height of 1.5 meters in an upright attitude (bottoms of the containers down) in a number of 10 containers and in a sideways attitude (bottoms of the containers sideways) in a number of 10 containers. The number of the containers that were broken were counted and was regarded as the shatter strength, which was then evaluated on the following basis. The containers marked with ○ and Δ were regarded to be in allowable ranges.

○: No container was broken.
Δ: The containers were not broken but were locally delaminated.
X: Some containers were broken.

(4) Shading in the Appearance.

The body wall of the obtained multilayered container was observed with the eye to evaluate shading in the appearance. The clouded portions having low transparency were regarded to be shading in the appearance. Maximum shadings in ten containers were measured and were evaluated on the following basis. The containers marked with ○ and Δ were regarded to be in allowable ranges.

○: No shading.
Δ: Less than 30% of the surface areas of the containers was shaded.
X: Not less than 30% of the surface areas of the containers was shaded.

(5) Close Adhesion.

A flat portion of the body of the obtained multilayered container was cut out into a size of 4 cm×6 cm, and was repetitively folded so as to form a line in the direction of height of the container to evaluate the close adhesion. Folding and unfolding were repeated 50 times so that the folded part became 0°. Ten containers were used and evaluated on the following basis. The containers marked with ○ and Δ were regarded to be in allowable ranges.

○: No delamination occurred.
Δ: No delamination occurred up to 40 times but occurred on the way up to 50 times.
X: Delamination occurred before 39 times.

(6) Overall Evaluation.

Overall evaluation was rendered as follows from the results of evaluating the buckling strength, tensile modulus of elasticity, shatter strength, shading in the appearance and close adhesion.

○: Evaluated to be "⊚ or ○" in all respects.
Δ: Evaluated to be "Δ" in any or some respects but evaluated to be "X" in none of the respects.
X: Evaluated to be "X" in at least one respect.

(Properties of the Resins that were Used).

The resins used for forming the layers were measured for their MFR's in compliance with the ASTM D123 (190° C.) and were measured for their densities in compliance with the ASTM D792.

(Resins and Lubricant that were Used).

The following resins and lubricant were used for forming the layers.

[Resins for Forming the Inner and Outer Layers]
Low-density polyethylene (LDPE)
MFR; 1.1 g/10 min., density; 0.92 g/cm³
(as a lubricant, oleic acid amide was contained in an amount of 300 ppm)

[Resin for Forming the Gas-Barrier Layer]
Ethylene-vinyl alcohol copolymer (EVOH)
density; 1.19 g/cm³, MFR (190° C.); 1.3 g/10 min.

[Resins for Forming the Adhesive Layers]
a) Maleic anhydride-modified linear low-density polyethylene-A.
("Acid-modified LLDPE-A" in Table 1) (used in an amount of 15% by weight)
MFR; 2.7 g/10 min.
Density; 0.946 g/cm³ b) Maleic anhydride-modified linear low-density polyethylene-B.
("Acid-modified LLDPE-B" in Table 1) (used in an amount of 98% by weight)
MFR; 0.8 g/10 min.
Density; 0.930 g/cm³ c) Maleic anhydride-modified low-density polyethylene-A.
("Acid-modified LDPE-A" in Table 1) (used in an amount of 98% by weight)
MFR; 1.0 g/10 min.
Density; 0.930 g/cm³ d) Homopolypropylene ("homoPP" in Table).
MFR; 0.5 g/10 min.
Density; 0.900 g/cm³ e) Block-copolymerized polypropylene ("copolymerized PP" in Table).
MFR; 0.6 g/10 min.
Density; 0.900 g/cm³ f) Linear low-density polyethylene ("LLDPE" in Table).
MFR; 1.0 g/10 min.
Density; 0.916 g/cm³

[Lubricant Master Batch]
The low-density polyethylene as a base material and the oleic acid amide as a lubricant were thrown into separate feeders, and were extruded by using a biaxial extruder to prepare a master batch containing the oleic acid amid in an amount of 3% by weight.

[Preparation of Pellets for Forming Adhesive Layers]
The pellets thrown into the adhesive layers were those obtained by dry-blending the pellets of the propylene resin, acid-modified polyethylene and linear low-density polyethylene that were weighed into predetermined amounts in percent by weight by using a tumbler.

Example 1

Resin pellets obtained by dry-blending the low-density polyethylene with 1.0% by weight of the lubricant master batch were fed into a 50-mm extruder to form the outer layer, a resin shown in Table 1 was fed into a 40-mm sub-extruder A to form the adhesive layer, an ethylene-vinyl alcohol copolymer was fed into a 40-mm sub-extruder B to form the gas-barrier layer, and resin pellets obtained by dry-blending the low-density polyethylene with 1.0% by weight of the lubricant master batch were fed into a 40-mm sub-extruder C to form the inner layer. These resins were extruded through a multi-layer die head heated at 210° C. to form a molten parison which was then melt-blow-formed in a customary manner into a tubular multilayered container of a three-kind-five-layer structure for containing ketchup having a diameter of nozzle ϕ025 mm, a volume of 300 ml and a weight of 11.8 g.

The body wall of the container possessed the layer constitution which on the average was as follows:

Outer layer 15.0% (67.5 μm)/adhesive layer 1.0% (4.5 μm)/gas-barrier layer 6.30% (28.4 μm)/adhesive layer 1.0% (4.5 μm)/inner layer 76.7% (345.2 μm).

The adhesive layers of the container possessed the resin constitution as described below.

2% By weight of mono PP as the PP resin, 15% by weight of acid-modified LLDPE-A as the acid-modified PE resin, and 83% by weight of LLDPE.

The container prepared above was evaluated for its buckling strength, tensile modulus of elasticity, shatter strength, shade in the appearance and close adhesion. The specifications of the container and the evaluated results were as shown in Table 1.

Example 2

A multilayered container was produced in the same manner as in Example 1 but changing the content of the homo PP into 0.5% by weight and the content of the LLDPE into 84.5% by weight in the adhesive layers. The thus produced container was evaluated in the same manner as in Example 1. The specifications of the container and the evaluated results were as shown in Table 1.

Example 3

A multilayered container was produced in the same manner as in Example 1 but changing the content of the homo PP into 10% by weight and the content of the LLDPE into 75% by weight in the adhesive layers. The thus produced container was evaluated in the same manner as in Example 1. The specifications of the container and the evaluated results were as shown in Table 1.

Example 4

A multilayered container was produced in the same manner as in Example 1 but using a block-copolymerized PP as the PP resin in the adhesive layers. The thus produced container was evaluated in the same manner as in Example 1. The specifications of the container and the evaluated results were as shown in Table 1.

Example 5

A multilayered container was produced in the same manner as in Example 1 but using 98% by weight of the acid-modified LLDPE-B as the acid-modified PE in the adhesive layers and using no LLDPE. The thus produced container was evaluated in the same manner as in Example 1. The specifications of the container and the evaluated results were as shown in Table 1.

Example 6

A multilayered container was produced in the same manner as in Example 1 but using 98% by weight of the acid-modified LDPE-A as the acid-modified PE in the adhesive layers and using no LLDPE. The thus produced container was evaluated in the same manner as in Example 1. The specifications of the container and the evaluated results were as shown in Table 1.

Example 7

A multilayered container was produced in the same manner as in Example 1 but constituting the layers of the multilayered container as described below. The thus produced container was evaluated in the same manner as in Example 1. The specifications of the container and the evaluated results were as shown in Table 1.

Outer layer 15.0% (67.5 μm)/adhesive layer 3.0% (13.5 μm)/gas-barrier layer 6.30% (28.4 μm)/ adhesive layer 3.0% (13.5 μm)/inner layer 72.7% (327.2 μm)

Comparative Example 1

A multilayered container was produced in the same manner as in Example 1 but using 100% by weight of the acid-modified LLDPE-B as the acid-modified PE in the adhesive layers and using neither the PP resin nor the LLDPE. The thus produced container was evaluated in the same manner as in Example 1. The specifications of the container and the evaluated results were as shown in Table 1.

Comparative Example 2

A multilayered container was produced in the same manner as in Example 1 but changing the content of the homo PP into 0.3% by weight and the content of the LLDPE into 84.7% by weight in the adhesive layers. The thus produced container was evaluated in the same manner as in Example 1. The specifications of the container and the evaluated results were as shown in Table 1.

Comparative Example 3

A multilayered container was produced in the same manner as in Example 1 but changing the content of the homo PP into 15% by weight and the content of the LLDPE into 70% by weight in the adhesive layers. The thus produced container was evaluated in the same manner as in Example 1. The specifications of the container and the evaluated results were as shown in Table 1.

<Control Example>

A multilayered container was produced in the same manner as in Example 1 but selecting the weight of the multilayered container to be 12.8 g, constituting the layers of the multilayered container as described below, using 100% by weight of the acid-modified LDPE-A in the adhesive layers and using neither the PP resin nor the LLDPE. The thus produced container was evaluated in the same manner as in Example 1. The specifications of the container and the evaluated results were as shown in Table 1.

Outer layer 15.0% (73.5 μm)/adhesive layer 0.65% (3.2 μm)/gas-barrier layer 6.30% (30.9 μm)/ adhesive layer 0.65% (3.2 μm)/inner layer 77.4% (379.3 μm)

TABLE 1

| | Weight · layer constitution (note) | Adhesive layers | | |
|---|---|---|---|---|
| | | PP resin (%) | Acid-modified PE (%) | LLDPE (%) |
| Ex. 1 | layer 1 | homoPP (2) | acid-modified LLDPE-A(15) | LLDPE(83) |
| 2 | layer 1 | homoPP (0.5) | ↑ | LLDPE(84.5) |
| 3 | layer 1 | homoPP (10) | ↑ | LLDPE(75) |
| 4 | layer 1 | copolymerizedPP (2) | ↑ | LLDPE(83) |
| 5 | layer 1 | homoPP (2) | acid-modified LLDPE-B(98) | none |
| 6 | layer 1 | homoPP (2) | acid-modified LDPE-A(98) | none |
| 7 | layer 2 | homoPP (2) | acid-modified LLDPE-A(15) | LLDPE(83) |
| Comp. Ex. 1 | layer 1 | none | acid-modified LLDPE-B(100) | none |
| 2 | layer 1 | homoPP (0.3) | acid-modified LLDPE-A(15) | LLDPE(84.7) |
| 3 | layer 1 | homoPP (15) | acid-modified LLDPE-A(15) | LLDPE(70) |
| Control Ex. | layer 3 | none | acid-modified LDPE-A(100) | none |

(Note)
① Layer 1 (weight 11.8 g, outer layer LDPE 15.0%, adhesive layer 1.0%, gas-barrier layer 6.30%, adhesive layer 1.0%, inner layer LDPE 76.7%).
② Layer 2 (weight 11.8 g, outer layer LDPE 15.0%, adhesive layer 3.0%, gas-barrier layer 6.30%, adhesive layer 3.0%, inner layer LDPE 72.7%).
③ Layer 3 (weight 12.8 g, outer layer LDPE 15.0%, adhesive layer 0.65%, gas-barrier layer 6.30%, adhesive layer 0.65%, inner layer LDPE 77.4%) large weight.

| | Evaluation | | | | | |
|---|---|---|---|---|---|---|
| | Buckling Strength | Tensile modulus of elasticity | Shatter strength | Shade in appearance | Close adhesion | Overall evaluation |
| Ex. 1 | ○ | ○ | ○ | ○ | ○ | ○ |
| 2 | Δ | Δ | ○ | ○ | ○ | Δ |
| 3 | ⊚ | ○ | Δ | Δ | Δ | Δ |
| 4 | Δ | Δ | ○ | ○ | ○ | Δ |
| 5 | ○ | ○ | ○ | ○ | ○ | ○ |
| 6 | ○ | ○ | ○ | Δ | ○ | Δ |
| 7 | ⊚ | ○ | ○ | ○ | ○ | ○ |
| Comp. Ex. 1 | X | Δ | X | ○ | ○ | X |

TABLE 1-continued

| | | | | | | |
|---|---|---|---|---|---|---|
| 2 | X | Δ | X | ◯ | ◯ | X |
| 3 | ◯ | ◯ | X | Δ | Δ | X |
| Control Ex. | ◯ | ◯ | ◯ | ◯ | ◯ | ◯ |

The invention claimed is:

1. A container of a multilayered structure comprising an inner layer and an outer layer of a low-density polyethylene, and an intermediate layer that includes a gas-barrier resin layer and adhesive layers, wherein said adhesive layers contain an acid-modified polyethylene and a propylene resin, said propylene resin being contained in an amount of 0.5 to 10% by weight in the adhesive layers and being one which has not been modified with acid.

2. The container of a multilayered structure according to claim 1, wherein said adhesive layers, further, contain a linear low-density polyethylene.

3. The container of a multilayered structure according to claim 1, wherein said acid-modified polyethylene is the one obtained by modifying a linear low-density polyethylene with an acid.

4. The container of a multilayered structure according to claim 1, wherein said acid-modified polyethylene has a density in a range of from 0.925 to 0.950 g/cm$^3$.

5. The container of a multilayered structure according to claim 1, the container of the multilayered structure being obtained by the direct blow-forming.

6. The container of a multilayered structure according to claim 1, wherein said propylene resin is a homopolypropylene or a copolymer obtained by copolymerizing a propylene with another α-olefin.

* * * * *